(12) United States Patent
Lee et al.

(10) Patent No.: US 12,474,858 B2
(45) Date of Patent: Nov. 18, 2025

(54) CONTROLLER, STORAGE DEVICE INCLUDING THE CONTROLLER, AND SIGNAL TUNING METHOD OF THE STORAGE DEVICE

(71) Applicant: SK hynix Inc., Icheon (KR)

(72) Inventors: Chan Hee Lee, Icheon (KR); Jin Su Park, Icheon (KR); Myeong Jae Kim, Icheon (KR)

(73) Assignee: SK hynix Inc., Icheon (KR)

( * ) Notice: Subject to any disclaimer, the term of this patent is extended or adjusted under 35 U.S.C. 154(b) by 120 days.

(21) Appl. No.: 18/465,071

(22) Filed: Sep. 11, 2023

(65) Prior Publication Data

US 2024/0345760 A1 Oct. 17, 2024

(30) Foreign Application Priority Data

Apr. 17, 2023 (KR) .................. 10-2023-0049877

(51) Int. Cl.
*G06F 3/06* (2006.01)

(52) U.S. Cl.
CPC .......... *G06F 3/0653* (2013.01); *G06F 3/0604* (2013.01); *G06F 3/0679* (2013.01)

(58) Field of Classification Search
CPC .... G06F 3/0653; G06F 3/0604; G06F 3/0679; G06F 11/00; G06F 11/006; G06F 11/2289; G06F 11/07; G06F 11/0751; G06F 11/2221; G06F 11/221; G06F 11/263; G06F 11/277; H04L 41/06
See application file for complete search history.

(56) References Cited

U.S. PATENT DOCUMENTS

| | | | |
|---|---|---|---|
| 9,568,542 B2 * | 2/2017 | Lin | .................. G01R 31/2834 |
| 2013/0145212 A1 | 6/2013 | Hsu et al. | |
| 2014/0029364 A1 | 1/2014 | Bhakta et al. | |
| 2022/0163588 A1 | 5/2022 | Froelich et al. | |

* cited by examiner

*Primary Examiner* — Idriss N Alrobaye
*Assistant Examiner* — Richard B Franklin

(57) ABSTRACT

Embodiments of the present disclosure may provide measures for performing tuning of signals transmitted and received by a storage device, by providing a test signal provided by a test signal generator included in the storage device to a loopback path between a transmission block and a reception block of the storage device. By easily performing signal tuning of the storage device and preventing or reducing distortion of signals transmitted and received by the storage device, operational performance of the storage device may be improved.

17 Claims, 10 Drawing Sheets

CONTROLLER, STORAGE DEVICE INCLUDING THE CONTROLLER, AND SIGNAL TUNING METHOD OF THE STORAGE DEVICE

CROSS-REFERENCE TO RELATED APPLICATION

The present application claims priority under 35 U.S.C. § 119 (a) to Korean Patent Application No. 10-2023-0049877 filed in the Korean Intellectual Property Office on Apr. 17, 2023, which is incorporated herein by reference in its entirety.

BACKGROUND

1. Technical Field

Various embodiments of the present disclosure generally relate to a controller, a storage device including the controller, and a signal tuning method of the storage device.

2. Related Art

A storage device may include a memory which includes a plurality of memory cells. As the case may be, the storage device may include a controller which communicates with the outside and controls operations of the memory.

The controller may perform communication with the outside using any one of various interface protocols. In order to improve operational performance of the storage device controlled by the controller, the controller may perform communication with the outside using a high-speed interface.

When the controller performs communication with the outside using the high-speed interface, a problem may exist in that distortion of a signal may occur due to various external or internal factors.

SUMMARY

Various embodiments of the present disclosure are directed to providing an apparatus and method capable of easily tuning signals transmitted and received to and from an external device by a storage device and preventing performance of the storage device from degrading due to distortion of the signals through the tuning of the signals.

According to the embodiments of the present disclosure, it is possible to prevent or reduce, through the tuning of the signals transmitted and received to and from the external device by the storage device, distortion of the signals, and to improve memory control performance by a controller of the storage device communicating with the external device.

In an embodiment, a storage device may include: a memory including a plurality of memory cells; and a controller configured to control an operation of the memory, the controller including: a physical layer configured to perform communication with the outside, and including a transmission block and a reception block; an interface controller configured to control an operation of the physical layer; and a test signal generator configured to generate an output test signal according to test data, and provide the output test signal through the transmission block to a loopback path which connects the transmission block and the reception block.

In an embodiment, a controller may include: a physical layer configured to perform communication with the outside, and including a transmission block and a reception block; an interface controller configured to output a control signal to the physical layer; a test signal generator configured to provide an output test signal according to test data to the transmission block; and a first multiplexer including an input terminal to which the control signal outputted by the interface controller and the output test signal outputted by the test signal generator are inputted and an output terminal which outputs a signal to the physical layer.

In an embodiment, a signal tuning method of a storage device may include: generating an output test signal according to test data; providing the output test signal through a transmission block to a loopback path which connects the transmission block and a reception block; obtaining an input test signal which is inputted to the reception block through the loopback path; and adjusting a parameter for at least one of the transmission block and the reception block on the basis of a result of comparing feedback data according to the input test signal and the test data.

DETAILED DESCRIPTION

Figure 1:
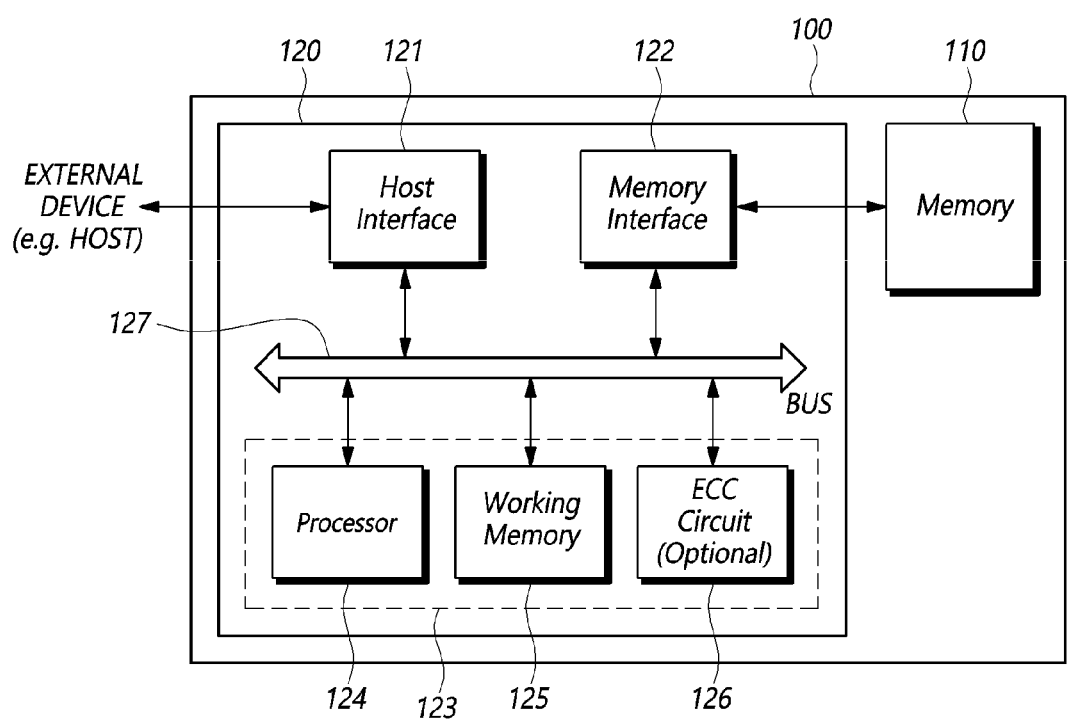
FIG. 1 illustrates a storage device according to an embodiment of the disclosed technology.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap," etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompass all the meanings of the term "can."

Hereinafter, various embodiments of the present disclosure will be described in detail with reference to accompanying drawings.

FIG. 1 is a schematic configuration diagram of a storage device 100 according to an embodiment of the disclosed technology.

Referring to FIG. 1, the storage device 100 may include a memory 110 which stores data, and a controller 120 which controls the memory 110.

The memory 110 may include a plurality of memory blocks, and may operate under the control of the controller 120. Operations of the memory 110 may include, for example, a read operation, a program operation (also referred to as a write operation), and an erase operation. The memory 110 may include a memory cell array including a plurality of memory cells (simply referred to as "cells") which store data. Such a memory cell array may exist in a memory block.

For example, the memory 110 may be implemented into any of various types such as a NAND flash memory, a 3D NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), and so forth.

The memory 110 may be implemented into a three-dimensional array structure. The embodiment of the disclosed technology may be applied to not only a flash memory in which a charge storage layer is configured by a conductive floating gate but also a charge trap flash (CTF) in which a charge storage layer is configured by a dielectric layer.

The memory 110 may receive a command and an address from the controller 120 and may access an area which is selected by the address in the memory cell array. The memory 110 may perform an operation instructed by the command, on the area selected by the address.

For example, the memory 110 may perform a program operation, a read operation, and an erase operation.

When performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (or program), read, erase, and background operations for the memory 110. For example, the background operation may include at least one among a garbage collection (GC) operation, a wear-leveling (WL) operation, a read reclaim (RR) operation, a bad block management (BBM) operation, and so forth.

The controller 120 may control the operation of the memory 110 according to a request from a device (e.g., a host) located outside the storage device 100. Also, the controller 120 may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, a mobility device (e.g., a vehicle, a robot or a drone) capable of driving under human control or autonomous driving, etc. Alternatively, the host may be a virtual/augmented reality device which provides a 2D or 3D virtual reality image or augmented reality image. Besides, the host may be any one of various electronic devices which require the storage device 100 capable of storing data.

The host may include at least one operating system. The operating system may generally manage and control the function and operation of the host, and may provide interoperability between the host and the storage device 100. The operating system may be classified into a general operating system and a mobile operating system depending on the mobility of the host.

The controller 120 and the host may be devices which are separated from each other. As the case may be, the controller 120 and the host may be implemented by being integrated into one device. Hereunder, for the sake of convenience in explanation, it will be described as an example that the controller 120 and the host are devices which are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface which uses at least one among various interface protocols such as a USB (Universal Serial Bus) protocol, an MMC (multimedia card) protocol, a PCI (Peripheral Component Interconnection) protocol, a PCI-E (PCI-express) protocol, an ATA (Advanced Technology Attachment) protocol, a serial-ATA protocol, a parallel-ATA protocol, an SCSI (Small Computer System Interface) protocol, an ESDI (Enhanced Small Disk Interface) protocol, an IDE (Integrated Drive Electronics) protocol, an SMBus (System Management Bus) protocol, an I2C (Inter-Integrated Circuit) protocol, an I3C (Improved Inter-Integrated Circuit) protocol, a CXL (Compute Express Link) protocol, and a private protocol.

When receiving a command from the host, the control circuit 123 may receive the command through the host interface 121, and may perform an operation of processing the received command.

The memory interface 122 may be coupled with the memory 110 to provide an interface for communication with the memory 110.

The memory interface 122 may be configured to provide an interface between the memory 110 and the controller 120 under the control of the control circuit 123.

The control circuit 123 performs a general control operation of the controller 120 to control the operation of the memory 110. To this end, for instance, the control circuit 123 may include at least one of a processor 124 and a working memory 125, and may selectively include an error detection and correction circuit (ECC circuit) 126.

The processor 124 may control the general operation of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate it into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host, by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110, by using a derandomizing seed. The derandomized data may be outputted to the host.

The processor 124 may execute firmware to control the operation of the controller 120. In order to control the general operation of the controller 120 and perform a logic calculation, the processor 124 may execute (or drive) firmware loaded in the working memory 125 upon booting. Hereafter, an operation of the storage device 100 to be described according to embodiments of the disclosed technology may be implemented in such a way that the processor 124 executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one among a flash translation layer (FTL) which performs a translating function between a logical address requested to the storage device 100 from the host and a physical address of the memory 110, a host interface layer (HIL) which serves to analyze a command requested to the storage device 100 from the host and transfer the command to the flash translation layer (FTL), and a flash interface layer (FIL) which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation which is defined in the firmware loaded in the working memory 125, to control the general operation of the controller 120. The processor 124 may store a result of performing the logic calculation defined in the firmware, in the working memory 125. The processor 124 may control the controller 120 to generate a command or a signal, according to a result of performing the logic calculation defined in the firmware. When a part of firmware in which a logic calculation to be performed is defined is not loaded in the working memory 125, the processor 124 may generate an event (e.g., an interrupt) for loading the corresponding part of the firmware in the working memory 125.

The processor 124 may load metadata necessary for driving firmware, from the memory 110. The metadata, as data for managing the memory 110, may include management information on user data stored in the memory 110.

Firmware may be updated while the storage device 100 is manufactured or while the storage device 100 is executed. The controller 120 may download new firmware from the outside of the storage device 100 and update existing firmware with the new firmware.

The working memory 125 may store firmware, a program code, a command and data which are necessary to drive the controller 120. Such a working memory 125 as, for example, a volatile memory, may include at least one among an SRAM (static RAM), a DRAM (dynamic RAM), an SDRAM (synchronous DRAM), and so forth.

The error detection and correction circuit 126 may detect an error bit of target data and correct the detected error bit, by using an error correction code. The target data may be, for example, data stored in the working memory 125 or data read from the memory 110.

The error detection and correction circuit 126 may be implemented to decode data by using the error correction code. The error detection and correction circuit 126 may be implemented by any of various code decoders. For example, a decoder which performs unsystematic code decoding or a decoder which performs systematic code decoding may be used.

For example, the error detection and correction circuit 126 may detect an error bit by the unit of a set sector in each of read data. Each read data may be constituted by a plurality of sectors. The sector may mean a data unit smaller than a page as a read unit of a flash memory. Sectors constituting each read data may be matched with one another by the medium of an address.

The error detection and correction circuit 126 may calculate a bit error rate (BER), and may determine whether an error is correctable or not, by the unit of a sector. For example, when a bit error rate is higher than a set reference value, the error detection and correction circuit 126 may determine that a corresponding sector is uncorrectable or failed. On the other hand, when a bit error rate is lower than the reference value, the error detection and correction circuit 126 may determine whether a corresponding sector is correctable or passed.

The error detection and correction circuit 126 may perform an error detection and correction operation sequentially for all read data. When a sector included in read data is correctable, the error detection and correction circuit 126 may omit an error detection and correction operation for a corresponding sector for next read data. When the error detection and correction operation for all read data is ended in this way, the error detection and correction circuit 126 may detect a sector which is determined to be uncorrectable to the last. There may be one or more sectors which are determined to be uncorrectable. The error detection and correction circuit 126 may transfer information (e.g., address information) on a sector which is determined to be uncorrectable, to the processor 124.

A bus 127 may be configured to provide channels among the components 121, 122, 124, 125 and 126 of the controller 120. The bus 127 may include, for example, a control bus for transferring various control signals, commands and the likes, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be incorporated into one component. As the case may be, in addition to the above-described components 121, 122, 124, 125 and 126 of the controller 120, one or more other components may be added.

For example, the controller 120 may further include a configuration for tuning signals transmitted and received to and from the outside. Tuning of the signals transmitted and received to and from the outside may be performed using a configuration for tuning signals. For example, tuning of signals transmitted and received through the host interface 121 of the controller 120 may be performed.

Figure 2:
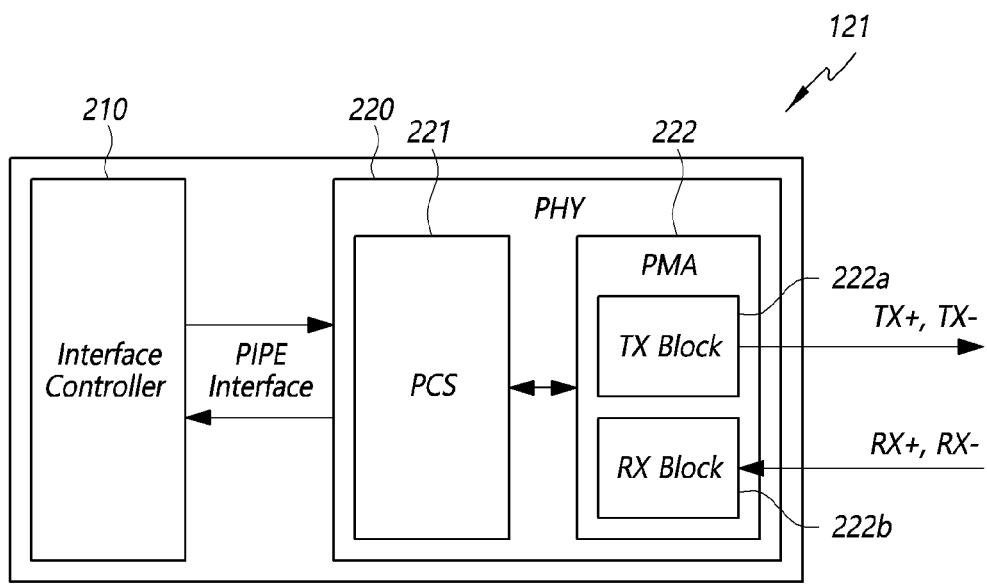
FIG. 2 illustrates a host interface included in a controller of a storage device according to an embodiment of the disclosed technology.

FIG. 2 is a diagram illustrating a configuration of the host interface 121 included in the controller 120 of the storage device 100 of FIG. 1 according to an embodiment of the disclosed technology.

Referring to FIG. 2, the host interface 121 may include an interface controller 210 and a physical layer 220. In an embodiment, the interface controller 210 may be implemented separately from the controller 120 and may be controlled by the controller 120. In another embodiment, the interface controller 210 may be implemented to be incorporated into the controller 120.

The interface controller 210 may control an operation of the physical layer 220. The interface controller 210 may transmit a control signal or data to be transmitted to the outside to the physical layer 220 according to a preset interface (e.g., a pipe interface). The interface controller 210 may process an operation according to a signal received through the physical layer 220.

The physical layer 220 may include a physical coding sublayer (PCS) 221 and a physical medium attachment unit (PMA) 222.

The physical coding sublayer 221 may encode data to be transmitted to the physical medium attachment unit 222, or may decode data received from the physical medium attachment unit 222.

The physical medium attachment unit 222 may include a transmission (TX) block 222a and a reception (RX) block 222b.

Communication with an external device such as the host may be performed by the transmission block 222a and the reception block 222b.

A signal transmitted to the outside through the transmission block 222a or a signal transmitted from the outside and inputted to the reception block 222b may be distorted due to external noise or signal attenuation. Signal distortion may be prevented or reduced by tuning signals transmitted and received through the transmission block 222a and the reception block 222b.

Embodiments of the present disclosure may provide an apparatus and method capable of tuning signals transmitted and received by the physical medium attachment unit 222 using a configuration located inside the storage device 100.

Figure 3:
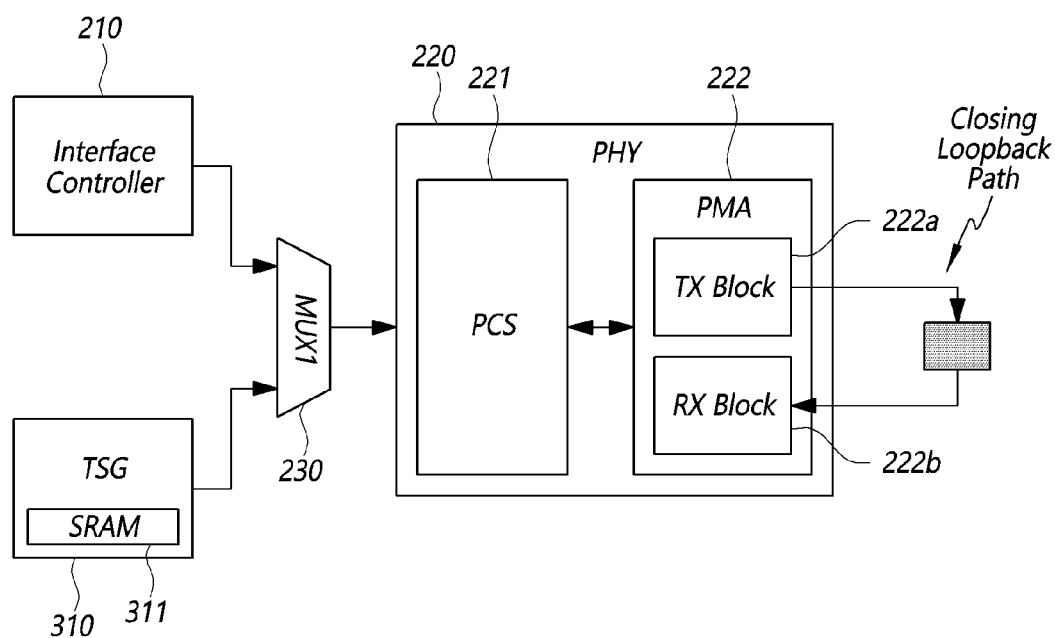
FIG. 3 illustrates a structure in which a controller of a storage device includes a configuration for signal tuning according to an embodiment of the disclosed technology.

FIG. 3 illustrates a structure in which the controller 120 of the storage device 100 of FIG. 1 includes a configuration for signal tuning according to an embodiment of the disclosed technology.

Referring to FIG. 3, the controller 120 may include an interface controller 210, a physical layer 220, and a test signal generator (TSG) 310. The controller 120 may further include a first multiplexer 230 which is positioned on a path through which a signal output from the interface controller 210 is transmitted to the physical layer 220.

The interface controller 210 may output a control signal or data to be transmitted to an external device to the physical layer 220, as a pipe signal. According to the pipe signal output by the interface controller 210, an operation of the physical layer 220 may be controlled or the data may be transmitted to the external device. Also, the interface controller 210 may receive a signal that is inputted to the physical layer 220 and process an operation according to the received signal.

The test signal generator 310 may provide a test signal for tuning signals transmitted and received by the physical layer 220. The test signal generator 310 may be implemented as a part of the host interface 121, or may be separate from the host interface 121.

For example, the test signal generator 310 may generate an output test signal according to test data. The test data may be various types of data which can be used to perform a test for the signal tuning. The test data may be data generated according to a preset pattern or randomly generated data (e.g., 10101010b). The test data may be data which is encoded, by a physical coding sublayer (PCS) 221 included in the physical layer 220, to be capable of being decoded. For example, the test data may be user data which is inputted by a user who controls the signal tuning. The test for the signal tuning may be performed according to the test data inputted by the user. When test data is user data, test data changed or selected by the user according to a type and a result of the signal tuning may be inputted to be used in the test for the signal tuning.

For another example, the test data may be system data generated by the processor 124 or the test signal generator 310 that are included in the storage device 100 in which the test for the signal tuning is performed. In this case, the test data may be randomly selected, or may be selected from a list of pre-stored test data.

The test data used for the signal tuning is not limited to the above examples, and various types of test data may be provided in various ways.

The test signal generator 310 may include a volatile memory 311 which stores the test data. When performing the test for the signal tuning, the test data such as the user data inputted by the user or the system data generated by the processor 124 or the test signal generator 310 may be stored in the volatile memory 311.

As the case may be, the volatile memory 311 which stores the test data may be located outside the test signal generator 310. Alternatively, the test data may be stored in the above-described working memory 125 or the like. In this case, the test signal generator 310 may receive the test data provided by the processor 124, and may generate and output the output test signal according to the test data.

For example, the test signal generator 310 may transmit, as the pipe signal, the output test signal generated according to the test data to the physical layer 220.

The first multiplexer 230 may be located on a path through which the output test signal output by the test signal generator 310 is transferred to the physical layer 220.

The first multiplexer 230 may include input terminals to which the control signal or the data outputted by the interface controller 210 and the output test signal outputted by the test signal generator 310 are inputted and an output terminal which outputs a pipe signal to the physical layer 220. The pipe signal is selected from among the control signal or the like provided by the interface controller 210 and the output test signal provided by the test signal generator 310.

The first multiplexer 230 may provide one of the control signal or the data output by the interface controller 210 and the output test signal output by the test signal generator 310 to the physical layer 220 according to an operation mode.

For example, in a normal mode, the first multiplexer 230 may transfer the control signal or the data to be transmitted to the external device to the physical layer 220. In a test mode (or tuning mode), the first multiplexer 230 may transfer the output test signal output by the test signal generator 310 to the physical layer 220.

The operation of the first multiplexer 230 may be controlled by, for example, the interface controller 210. Alternatively, the operation of the first multiplexer 230 may be controlled by the processor 124.

The output test signal output by the test signal generator 310 may be provided to the physical layer 220 by the operation of the first multiplexer 230 according to the operation mode.

The output test signal may be provided to a transmission block 222a which is included in a physical medium attachment unit 222 of the physical layer 220. The output test signal may be transmitted to the outside through the transmission block 222a. The output test signal may be provided to a loopback path which connects the transmission block 222a and a reception block 222b. The output test signal having passed through the loopback path may be inputted to the reception block 222b as an input test signal.

Distortion of a signal may be checked using a signal which is transmitted through the transmission block 222a and is inputted to the reception block 222b. According to distortion of a signal, tuning on signals which are transmitted and received through the transmission block 222a and the reception block 222b may be performed.

For example, a waveform of a signal may be checked by a waveform checking device such as an oscilloscope connected to the loopback path which connects the transmission block 222a and the reception block 222b.

At least one of parameters associated with the physical medium attachment unit 222 of the physical layer 220 may be adjusted based on the waveform of the signal checked by the waveform checking device. According to the adjustment of the at least one parameter, the waveform of the signal may be changed, and thus the distortion of the signal may be prevented or reduced.

As such, in the embodiments of the present disclosure, a test signal may be provided by the test signal generator 310 which is included inside the controller 120, and the signal tuning may be performed by checking signals transmitted and received between the transmission block 222a and the reception block 222b through the loopback path. Thus, tuning of signals transmitted and received to and from the outside by the storage device 100 may be easily performed.

FIG. 3 illustrates a case where the signal tuning is performed using signals transferred through the loopback path formed between the transmission block 222a and the reception block 222b included in the same storage device 100. However, embodiments are not limited thereto. In another embodiment, the signal tuning may be performed using signals transmitted and received between a transmission block 222a and a reception block 222b that are included in different storage devices 100, respectively.

For example, a reception block 222b of a first storage device 100 receives an output test signal transmitted by a transmission block 222a of a second storage device 100 including a test signal generator 310, and the signal tuning is performed on the basis of waveforms of signals transmitted and received between the first and second storage devices 100.

Tuning of signals transmitted and received by the storage device 100 may be performed by adjusting at least one of parameters associated with the transmission block 222a and the reception block 222b included in the physical medium attachment unit 222.

Figure 4:
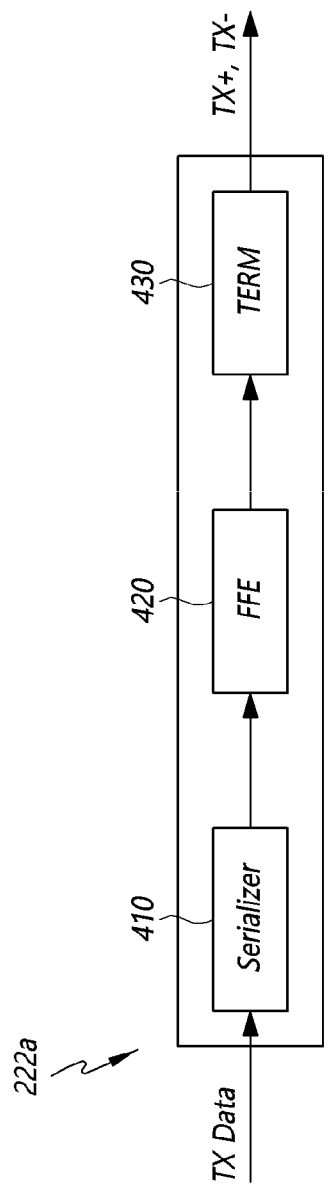
FIG. 4 illustrates a transmission block included in a host interface of a controller according to an embodiment of the disclosed technology.
Figure 5:
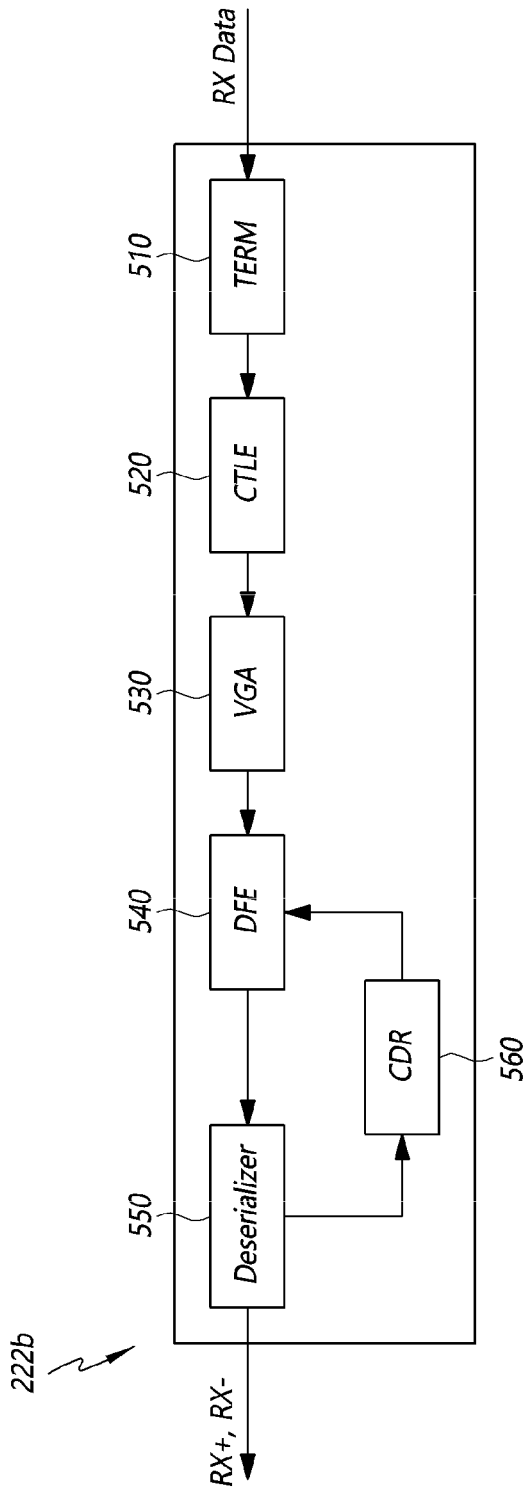
FIG. 5 illustrates a reception block included in the host interface according to an embodiment of the disclosed technology.

FIG. 4 illustrates a transmission block 222a included in a host interface 121 according to an embodiment of the disclosed technology. FIG. 5 illustrates a reception block 222b included in the host interface 121 according to an embodiment of the disclosed technology.

Referring to FIG. 4, the transmission block 222a may include a serializer 410, a transmit equalizer (FFE) 420, and an output terminal (TERM) 430. Referring to FIG. 5, the reception block 222b may include an input terminal (TERM) 510, a first receive equalizer (CTLE) 520, a variable gain amplifier (VGA) 530, a second receive equalizer (DFE) 540, a deserializer 550, and a clock and data recovery circuit (CDR) 560.

Through adjustment of a parameter associated with each process in which processing of a signal passing through the transmission block 222a or the reception block 222b is performed, the waveform of the signal may be corrected, and distortion of the signal may be removed or reduced.

For example, an input signal TX Data inputted to the transmission block 222a may be output through the output terminal 430 after passing through the serializer 410 and the transmit equalizer 420.

The serializer 410 of the transmission block 222a may serialize the input signal TX Data, and output a serialized input signal to the transmit equalizer 420.

The transmit equalizer 420 of the transmission block 222a may perform equalization on the serialized input signal according to, for example, a feed forward equalization (FFE) scheme.

The transmit equalizer 420 may generate a transmission signal by amplifying a portion of the input signal TX Data to be distorted due to a channel loss. The transmission signal generated by the transmit equalizer 420 may be adjusted by adjusting a coefficient parameter of an internal filter, and accordingly, the waveform of the transmission signal to be outputted by the transmission block 222a may be adjusted.

An input signal RX Data inputted to the reception block 222b may be inputted through the input terminal 510, and may be outputted by passing through the first receive equalizer 520, the variable gain amplifier 530, the second receive equalizer 540, and the deserializer 550.

The first receive equalizer 520 of the reception block 222b may perform equalization on the input signal RX Data according to, for example, a continuous time linear equalization (CTLE) scheme.

The first receive equalizer 520 may adjust all frequency components of the input signal RX Data to be similar in magnitude by amplifying magnitudes of high frequency components of the input signal RX Data. The first receive equalizer 520 may adjust the input signal RX Data by adjusting a coefficient parameter of an internal filter thereof, and output a first equalized signal.

The variable gain amplifier 530 of the reception block 222b may amplify the first equalized signal and output an amplified signal. the variable gain amplifier 530 may adjust the first equalized signal by adjusting an internal gain parameter thereof.

The second receive equalizer 540 of the reception block 222b may perform equalization on the amplified signal generated by the variable gain amplifier 530 according to, for example, a decision feedback equalization (DFE) scheme.

The second receive equalizer 540 may compensate the input signal RX Data without increasing a noise level of a path through which the input signal RX Data is received. The second receive equalizer 540 may adjust the amplified signal by adjusting a coefficient parameter of an internal filter thereof.

The clock and data recovery circuit 560 of the reception block 222b may perform an operation of maintaining clock synchronization in order for accurate reproduction/recovery of an original signal. The clock and data recovery circuit 560 may adjust a signal input thereto by adjusting a parameter associated with an internal PLL (phase locked loop) therein.

As such, waveforms of signals transmitted and received between the transmission block 222a and the reception block 222b of the physical medium attachment unit 222 may be adjusted by adjusting at least one of parameters associated with the transmission block 222a and the reception block 222b.

Tuning of signals transmitted and received between the transmission block 222a and the reception block 222b may be performed by obtaining an input test signal inputted to the reception block 222b and then comparing the input test signal with an output test signal output through the transmission block 222a.

FIGS. 6 to 9 each illustrate a structure in which the controller 120 of the storage device 100 includes a configuration for signal tuning according to an embodiment of the disclosed technology.

Figure 6:
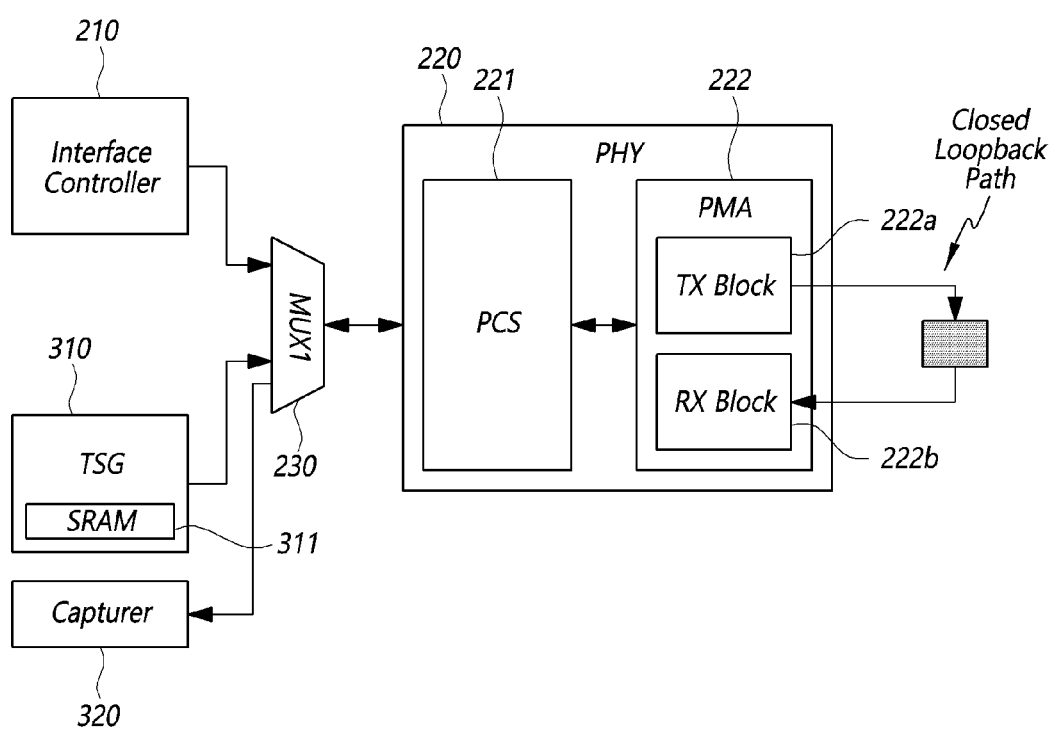
FIGS. 6 to 9 each illustrate a structure in which a controller of a storage device includes a configuration for signal tuning according to an embodiment of the disclosed technology.

Referring to FIG. 6, the controller 120 may include an interface controller 210, a physical layer 220, a first multiplexer 230, a test signal generator 310, and a capturer 320.

The first multiplexer 230 may be connected to the interface controller 210, the test signal generator 310, and the capturer 320 through signal lines. The first multiplexer 230 may be further connected to the physical layer 220 through a signal line.

The test signal generator 310 may generate an output test signal according to test data and output the output test signal to the first multiplexer 230. In a test mode, the first multiplexer 230 may provide the output test signal to the physical layer 220.

The output test signal may be transmitted to the outside through a transmission (TX) block 222a of a physical medium attachment unit 222 in the physical layer 220. The output test signal may pass through a loopback path which is connected between the transmission block 222a and the reception block 222b and be inputted to a reception block 222b of the physical medium attachment unit 222 as an input test signal.

The input test signal obtained by the reception block 222b may be transferred to the first multiplexer 230. In this case, the signal line between the first multiplexer 230 and the physical layer 220 may be capable of bidirectional communication.

The input test signal may be transferred to the capturer 320 through the first multiplexer 230. The capturer 320 may capture the input test signal and generate feedback data according to the input test signal.

The feedback data may be compared with the test data used to generate the output test signal.

According to a result of comparing the feedback data and the test data, distortion of the output test signal may be checked. At least one of the parameters associated with the transmission block 222a and the reception block 222b may be adjusted for the signal tuning based on the comparison result.

As the case may be, another multiplexer may be disposed on a path through which the input test signal is transferred to the capturer 320.

Figure 7:
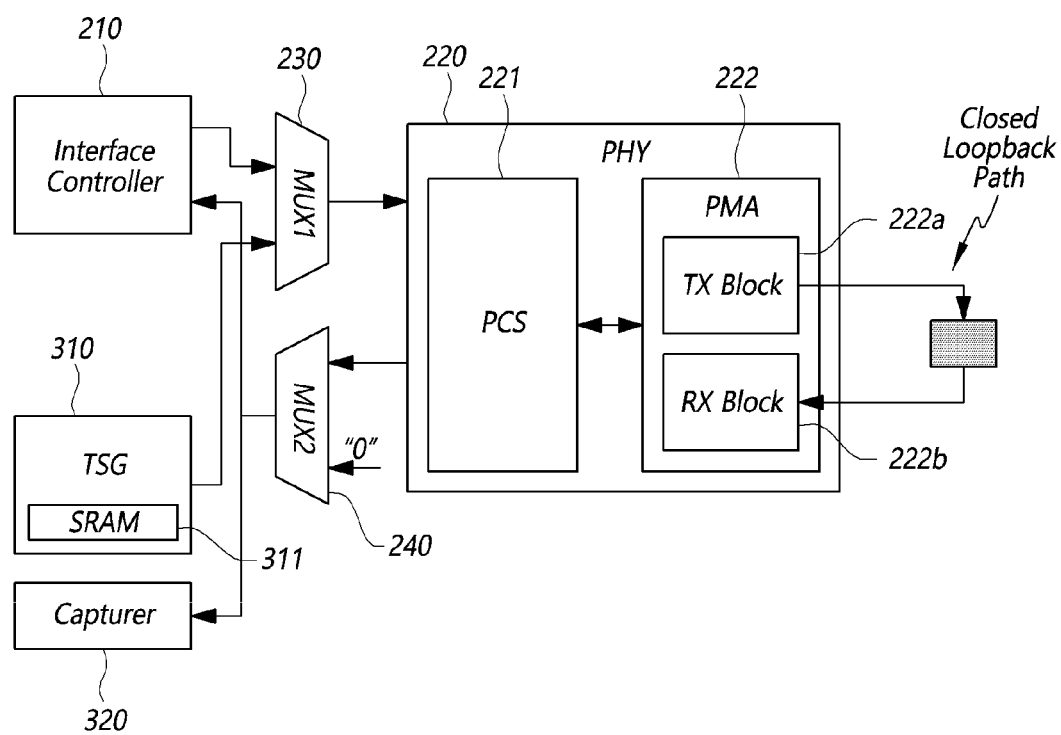

Referring to FIG. 7, the controller 120 may include an interface controller 210, a physical layer 220, a first multiplexer 230, a second multiplexer 240, a test signal generator 310, and a capturer 320.

The first multiplexer 230 may include input terminals which receive a control signal outputted by the interface controller 210 and an output test signal outputted by the test signal generator 310, and an output terminal which outputs one of the control signal and the output test signal to the physical layer 220.

In a test mode, the first multiplexer 230 may transfer the output test signal output by the test signal generator 310 to the physical layer 220.

The output test signal may be provided to a loopback path which connects a transmission block 222a and a reception block 222b in the physical layer 220. The output test signal may be transmitted through the loopback path and inputted to the reception block 222b as an input test signal.

The input test signal may be provided to the second multiplexer 240.

The second multiplexer 240 may output the input test signal to the interface controller 210 and the capturer 320. In the test mode, the second multiplexer 240 may provide the input test signal received from the physical layer 220 to the interface controller 210 and the capturer 320.

In a normal mode, the second multiplexer 240 may output a command or the like received from the outside.

During a period in which the input test signal or the like is not received from the physical layer 220, the second multiplexer 240 may output a preset value (e.g., 0).

The second multiplexer 240 may simultaneously output signals to the interface controller 210 and the capturer 320, and may provide the input test signal to the capturer 320 in the test mode. The capturer 320 may capture the input test signal and output feedback data according to the input test signal.

According to a result of comparing the feedback data and test data used to generate the output test signal, at least one of parameters associated with the transmission block 222a and the reception block 222b may be adjusted.

As such, separate multiplexers may be disposed in a transfer path of the output test signal and a transfer path of the input test signal for tuning of signals transmitted and received by the transmission block 222a and the reception block 222b, and an operation for tuning a signal may be performed.

As the case may be, the second multiplexer 240 may distinguish a signal to be transmitted to the interface controller 210 from a signal to be transmitted to the capturer 320.

Figure 8:
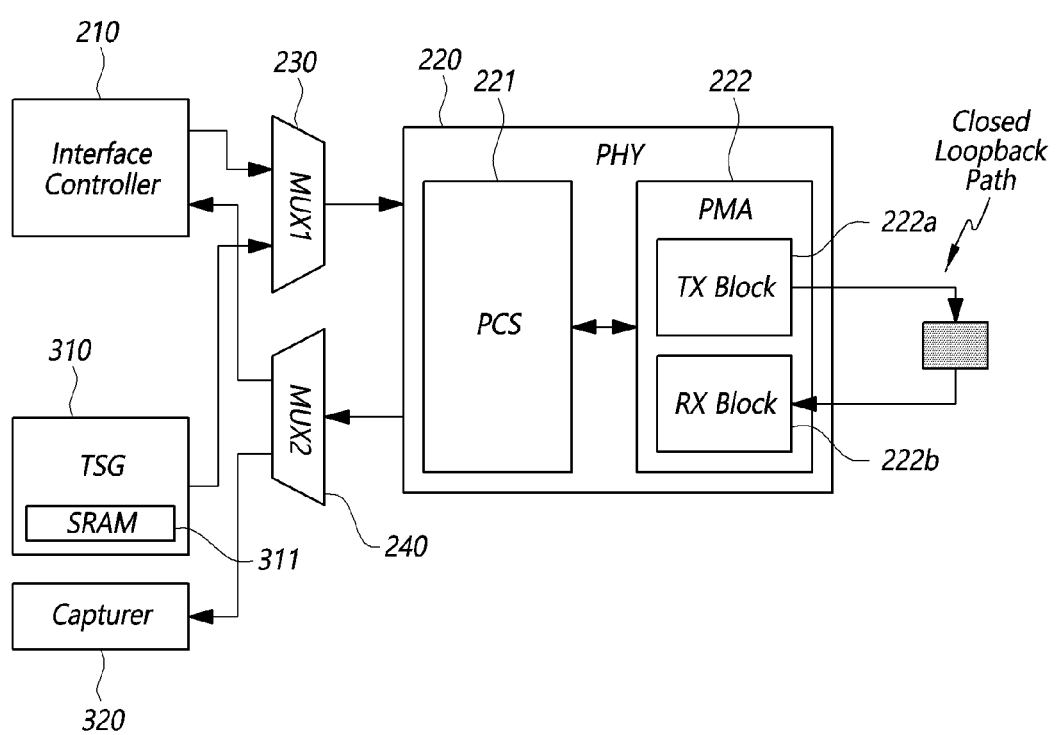

Referring to FIG. 8, the controller 120 may include a first multiplexer 230 which is located on a path through which a control signal is transmitted from an interface controller 210 to a physical layer 220.

The controller 120 may further include a second multiplexer 240 which is located on a path through which a signal received from the outside is transmitted from the physical layer 220 to the interface controller 210.

An output test signal output by a test signal generator 310 may be provided to the physical layer 220 through the first multiplexer 230.

The first multiplexer 230 may provide, in a normal mode, the control signal outputted by the interface controller 210 to the physical layer 220, and may provide, in a test mode, the output test signal outputted by the test signal generator 310 to the physical layer 220.

As the output test signal is provided to a loopback path between a transmission block 222a and a reception block 222b, an input test signal may be inputted to the reception block 222b through the loopback path.

The input test signal may be provided to a capturer 320 through the second multiplexer 240.

The second multiplexer 240 may provide, in the normal mode, a signal received from the outside to the interface controller 210, and may provide, in the test mode, the input test signal to the capturer 320.

In the normal mode and the test mode, paths through which a signal received through the physical layer 220 is transferred may be different.

The capturer 320 may generate feedback data by capturing the input test signal. According to a comparison result of the feedback data and test data used to generate the output test signal, parameter adjustment for correcting distortion of a signal may be performed.

The data comparison and/or the parameter adjustment may be performed by, for example, the processor 124 included in the controller 120 shown in FIG. 1.

Figure 9:
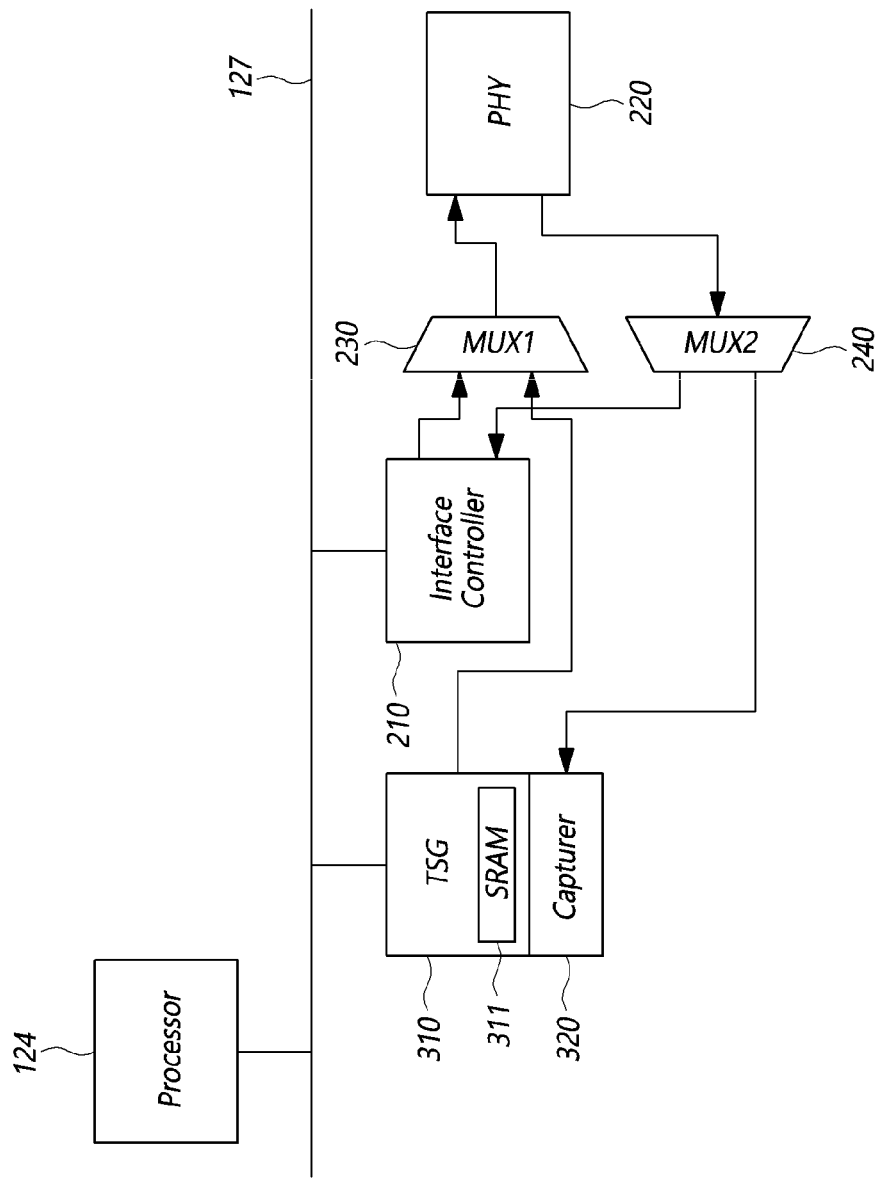

Referring to FIG. 9, the processor 124 of the controller 120 may communicate with the interface controller 210 and the test signal generator 310 through the bus 127.

The capturer 320 may be separate from the test signal generator 310, or may be incorporated into the test signal generator 310 as illustrated in FIG. 9.

In the normal mode, the processor 124 may control the interface controller 210 and may control communication with the outside through the physical layer 220.

In the test mode, the processor 124 may control the test signal generator 310 and may control tuning of signals transmitted and received by the physical layer 220.

For example, in the test mode, the test signal generator 310 may generate an output test signal using test data stored in a volatile memory 311 under the control of the processor 124.

In the test mode, the first multiplexer 230 may provide the output test signal output by the test signal generator 310 to the physical layer 220.

An input test signal may be inputted to the reception block 222b through the loopback path between the transmission block 222a and the reception block 222b of the physical layer 220.

In the test mode, the second multiplexer 240 may provide the input test signal input to the reception block 222b to the capturer 320. The capturer 320 may capture the input test signal and generate feedback data based on the input test signal.

The feedback data may be provided to the processor 124.

The processor 124 may compare the feedback data and the test data. The processor 124 may adjust at least one parameter associated with the physical layer 220 according to a result of comparing the feedback data and the test data. That is, the processor 124 may perform tuning of signals transmitted and received through the physical layer 220.

Since the tuning of signals may be performed by a configuration included in the storage device 100, the tuning of signals transmitted and received when the storage device 100 communicates with an external device such as a host may be easily performed.

Figure 10:
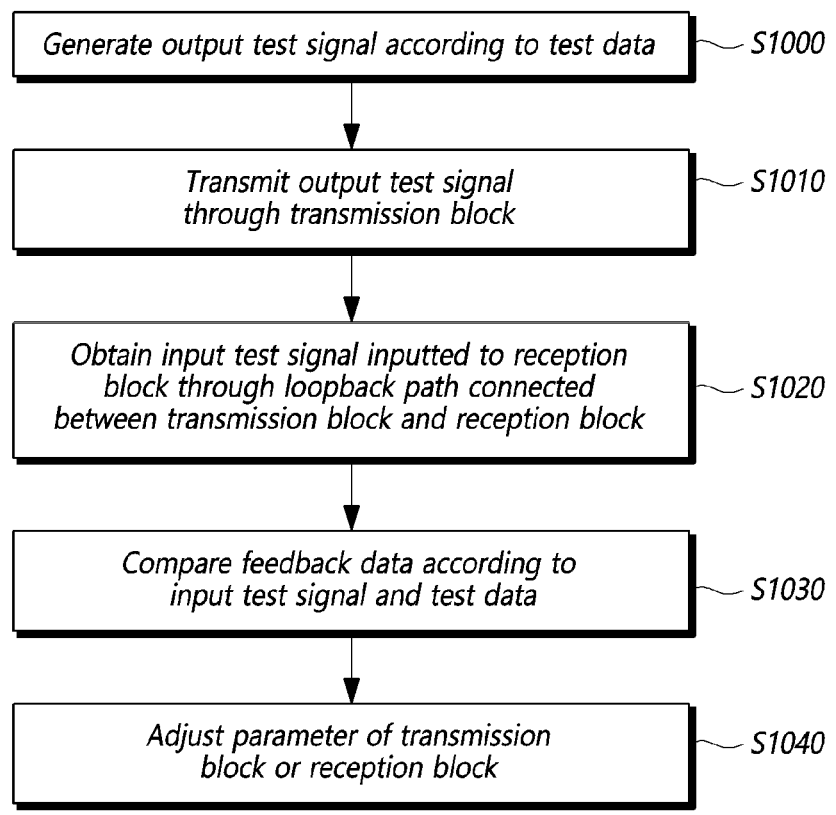
FIG. 10 illustrates a signal tuning method of a storage device according to an embodiment of the disclosed technology.

FIG. 10 illustrates a signal tuning method of a storage device according to an embodiment of the disclosed technology. The signal tuning method illustrated in FIG. 10 may be performed by the storage device 100 described above.

Referring to FIG. 10, the storage device 100 may generate an output test signal according to test data for tuning of a signal (S1000).

The storage device 100 may transmit the output test signal to the outside through the transmission block 222a (S1010).

The output test signal transmitted to the outside may be provided to the loopback path which connects the transmission block 222a and the reception block 222b. The output test signal which has passed the loopback path may be inputted to the reception block 222b as an input test signal (S1020).

The loopback path between the transmission block 222a and the reception block 222b may be a path which is formed between the transmission block 222a and the reception block 222b included in the same storage device 100. Alternatively, as the case may be, the loopback path may be a path which is formed between a transmission block 222a included in a first storage device and a reception block 222b included in a second storage device that is different from the first storage device.

The storage device 100 may compare feedback data generated according to the input test signal with the test data (S1030).

According to a result of comparing the feedback data and the test data, the storage device 100 may adjust one or more parameters associated with at least one of the transmission block 222a and the reception block 222b (S1040).

The parameter adjustment may be performed on the basis of, for example, a waveform checked by a waveform checking device connected to the loopback path. Alternatively, the parameter adjustment may be performed on the basis of a result of comparing the feedback data and the test data.

The tuning of signals may be performed using the test signal generator 310 implemented inside the storage device 100 and the loopback path formed between the transmission block 222a and the reception block 222b of the storage device 100. Therefore, the tuning of signals transmitted and received when the storage device 100 communicates with an external device may be easily performed, and it is possible to prevent or reduce performance degradation of the storage device 100 due to distortion of a signal.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A storage device comprising:
a memory including a plurality of memory cells; and
a controller configured to control an operation of the memory,
wherein the controller comprises:
a physical layer configured to communicate with an external device, and including a transmission block and a reception block;
an interface controller configured to control an operation of the physical layer;
a test signal generator configured to generate an output test signal based on test data, and provide the output test signal to the physical layer, the output test signal being provided to a loopback path through the transmission block, the loopback path connecting the transmission block and the reception block;
a capturer configured to capture an input test signal which is inputted to the reception block through the loopback path; and
a first multiplexer configured to receive the input test signal from the reception block and output a signal to at least one of the interface controller or the capturer.

2. The storage device according to claim 1, wherein the controller further comprises:
a second multiplexer configured to receive a control signal output by the interface controller and the output test signal output by the test signal generator and output one of the control signal and the output test signal to the physical layer.

3. The storage device according to claim 2, wherein, in a test mode, the second multiplexer outputs the output test signal to the physical layer.

4. The storage device according to claim 1, wherein the first multiplexer simultaneously outputs the signal to the interface controller and the capturer, the signal being one of the input test signal and a preset value.

5. The storage device according to claim 1, wherein the first multiplexer outputs the input test signal to the capturer in a test mode, and outputs a preset value to the interface controller during a period other than the test mode.

6. The storage device according to claim 1, wherein the controller compares feedback data with the test data, and according to a comparison result, adjusts at least one of parameters associated with the transmission block and the reception block, the feedback data being generated based on the input test signal.

7. The storage device according to claim 1, wherein the test signal generator comprises:
a volatile memory in which the test data is stored.

8. The storage device according to claim 1, wherein a waveform of a signal which passes through the loopback path is checked by a waveform checking device which is connected to the loopback path, and at least one of parameters associated with the transmission block and the reception block is adjusted based on the waveform of the signal.

9. A controller comprising:
a physical layer configured to communicate with an external device, and including a transmission block and a reception block;
an interface controller configured to output a control signal to the physical layer;
a test signal generator configured to provide an output test signal generated based on test data to the transmission block;
a first multiplexer configured to receive the control signal output by the interface controller and the output test signal output by the test signal generator and output one of the control signal and the output test signal to the physical layer;
a capturer configured to capture an input test signal which is inputted to the reception block; and
a second multiplexer configured to receive the input test signal from the reception block and output a signal to at least one of the interface controller or the capturer.

10. The controller according to claim 9, wherein the first multiplexer outputs the control signal to the physical layer in a normal mode, and outputs the output test signal to the physical layer in a test mode.

11. The controller according to claim 9, wherein the output test signal is provided to a loopback path which connects the transmission block and the reception block, and the output test signal which has passed through the loopback path is inputted to the reception block as the input test signal.

12. The controller according to claim 11,
wherein the capturer is configured to capture the input test signal and generate feedback data based on the captured input test signal.

13. The controller according to claim 12, wherein the feedback data is compared with the test data, and according to a comparison result, at least one of parameters associated with the transmission block and the reception block is adjusted.

14. The controller according to claim 12,
wherein the second multiplexer is located on a path through which the input test signal is transferred to the capturer from the physical layer.

15. A signal tuning method, the method comprising:
generating, by a test signal generator, an output test signal based on test data;
providing, by a first multiplexer between a physical layer and an interface controller or the test signal generator, the output test signal through a transmission block to a loopback path which connects the transmission block and a reception block of the physical layer;
capturing, by a capturer, an input test signal which is inputted to the reception block through the loopback path;
generating, by the capturer, feedback data based on the input test signal; and
adjusting, by a storage device, at least one of parameters associated with the transmission block and the reception block based on a result of comparing the feedback data and the test data,
wherein the signal tuning method further comprises:
receiving, by a second multiplexer, the input test signal from the reception block; and
outputting, by the second multiplexer, a signal to at least one of the interface controller or the capturer.

16. The signal tuning method according to claim 15, wherein the output test signal is provided to the transmission block through the first multiplexer which is located on a path between the interface controller and the transmission block, the interface controller being included in the storage device.

17. The signal tuning method according to claim 15, wherein the transmission block and the reception block are included in a single storage device or in two different storage devices, respectively.

* * * * *